H. DIENER.
AUTOMOBILE TIRE.
APPLICATION FILED DEC. 12, 1916.
1,254,994. Patented Jan. 29, 1918.
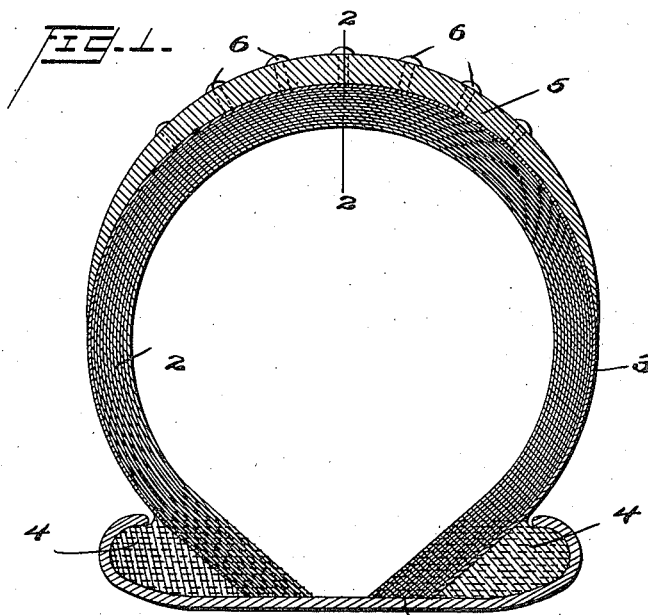
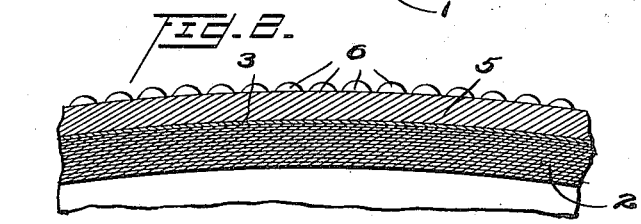
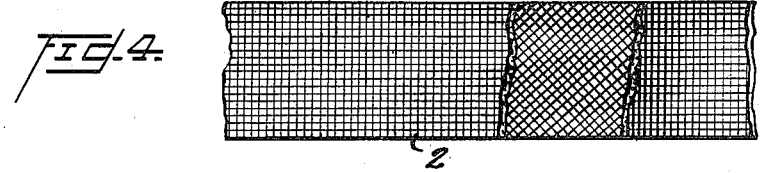
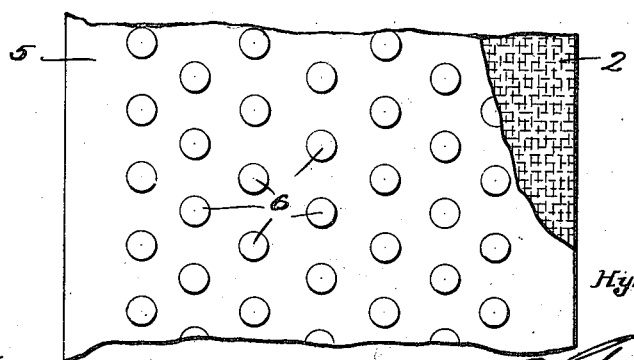
Witness
Arnold Straus
Inventor
Hyman Diener
By Herbert J. Jacobi
Attorney

UNITED STATES PATENT OFFICE.

HYMAN DIENER, OF WASHINGTON, DISTRICT OF COLUMBIA.

AUTOMOBILE-TIRE.

1,254,994. Specification of Letters Patent. Patented Jan. 29, 1918.

Application filed December 12, 1916. Serial No. 136,429.

*To all whom it may concern:*

Be it known that I, HYMAN DIENER, a citizen of the United States, residing at Washington, in the District of Columbia, have invented certain new and useful Improvements in Automobile-Tires, of which the following is a specification.

This invention relates to new and useful improvements in automobile tires and more particularly to a casing for pneumatic tires and the primary object of the invention is to provide an improved casing which is entirely free from use of rubber and which will be equal to, if not greater than, rubber in strength, durability and general efficiency.

A further object of the invention resides in providing a casing which will be extremely inexpensive to manufacture, it being a well known fact that tire expense is the greatest in the upkeep of automobiles due to the high cost of rubber.

Still another object of the invention resides in providing a casing, the base or foundation of which is constructed of layers of fabric, such as canvas, which layers are treated to provide great strength and at the same time to become water-proof.

A further object resides in providing an improved casing which may be provided with an anti-skidding means thereon, and a still further object resides in the provision of a device which is simple and durable in construction, inexpensive to manufacture and one which will be very efficient in use.

Still another object of the invention resides in providing a fabric which is not only adapted for use in connection with the manufacture of tires, but which may be equally well used for belting or as a substitute for rubber or leather in any use to which the same may be applied.

With these and other objects in view my invention consists in the novel features of construction, combination and arrangement of parts, as will be hereinafter referred to and more particularly pointed out in the specification and claims.

In the accompanying drawing forming a part of this application:—

Figure 1 is a transverse section through a device constructed in accordance with my invention;

Fig. 2 is a fragmentary longitudinal section therethrough as seen on the line 2—2 of Fig. 1; and Fig. 3 is a plan view of the tire.

Fig. 4 is a plan view with parts broken away to show the relation of the layers of fabric to one another.

This application forms a companion application to my pending application filed October 31, 1916, Serial No. 128,785, certain claims of the latter case containing elements forming the basis of the present application.

In describing my invention I shall refer to the drawing in which similar reference characters designate corresponding parts throughout the several views and in which 1 refers to a rim of the usual or any preferred type used on automobile wheels, to which is to be applied my improved tire casing. This casing or shoe, as the same is commonly known, consists of a plurality of layers of fabric, preferably canvas, designated in the drawing as 2. In the construction of the tire, the layers of canvas are first boiled in salt water, which not only shrinks the material but also prevents said material from losing any of its strength when the same passes through the various other steps in the process, as outlined herebelow, and the layers of canvas are then permitted to dry, whereupon the same are pressed. The layers are then cut in strips, certain of the same being cut straight or longitudinally of the length of the fabric, certain others cross-wise or transversely thereof and others on the bias, and these strips are then stitched together with silk thread longitudinally and transversely, the lines of stitching being close together, as clearly shown in Fig. 3 of the drawing. After stitching the layers together, the fabric is soaked in oil and allowed to dry, or other means may be provided which make the same waterproof, as may be desired. It may be here stated also that the water-proofing of the fabric may be performed prior to the stitching if found desirable.

The fabric above described forms the basis of my improved casing and it is believed that a tire so constructed would, in itself, be sufficiently strong to prevent "blowouts," but I prefer to make certain of its strength in this connection and over the outer face of the casing to completely cover the same, I provide a layer of leather designated in the drawing as 3. This layer is preferably formed of buckskin or rawhide and is stitched in place to the layers 2.

To the outer edges of the casing are secured the beads 4, which are preferably formed of heavy leather and stitched or otherwise secured in place, the stitching of these beads also acting as a further securing means at these points for the various layers, constituting the tire proper.

For the purpose of providing great wear and durability to this tire I provide a tread section 5 formed of heavy leather, the same being secured in any approved manner to the outer tread section of the casing on the out side of the layer 3. This tread section 5 is preferably provided with metal rivets or studs 6 which constitute anti-skidding means therefor and also act as wear surfaces for the tire.

A tire constructed as above described, will unquestionably prove efficient in every respect, and endure great wear. The resiliency may be readily obtained through the flexibility of the sides of the casing in connection with the pneumatic tube therewithin, and in view of the great strain and pressure which this fabric is capable of enduring, the possibility of "blow-outs" will be greatly decreased.

I have described my improved fabric principally for use in the manufacture of tires, but it will be understood that my invention primarily involves the manufacture of a particular fabric which may be used for belting or as a substitute for leather or rubber in any use to which the same may be applied.

From the foregoing, it will be seen that I have provided a simple, inexpensive and efficient means for carrying out the objects of the invention and while I have particularly described the elements best adapted to perform the functions set forth, it is obvious that various changes in form, proportion and in the minor details of construction, may be resorted to, within the scope of the appended claims, without departing from the spirit or sacrificing any of the principles of the invention.

Having thus described my invention, what I claim and desire to secure by Letters Patent is:—

1. A tire including a body formed of layers of fabric respectively cut longitudinally, on the bias and transversely, said layers being boiled in salt water, waterproofed and stitched together, a tread section for the body and beads therefor.

2. As an article of manufacture, a body comprising layers of fabric respectively cut longitudinally, on the bias and transversely of their length, said layers being boiled in salt water, water-proofed and secured together.

3. As an article of manufacture, a body comprising layers of fabric, respectively cut longitudinally, on the bias and transversely of their length, said layers being boiled in salt water, water-proofed and stitched together longitudinally and transversely.

In testimony whereof I affix my signature in the presence of two witnesses.

HYMAN DIENER.

Witnesses:
F. M. RAWLINGS,
M. W. FLYNN.